United States Patent
Pass

(10) Patent No.: US 7,100,078 B1
(45) Date of Patent: Aug. 29, 2006

(54) METHOD AND APPARATUS FOR RESTORATION OF LOST BLOCKS IN A MULTICAST DATA TRANSMISSION

(75) Inventor: Alexander M. Pass, North Andover, MA (US)

(73) Assignee: Network Appliance, Inc., Sunnyvale, CA (US)

( * ) Notice: Subject to any disclaimer, the term of this patent is extended or adjusted under 35 U.S.C. 154(b) by 548 days.

(21) Appl. No.: 10/237,392

(22) Filed: Sep. 9, 2002

Related U.S. Application Data

(60) Provisional application No. 60/335,996, filed on Nov. 15, 2001.

(51) Int. Cl.
*G06F 11/00* (2006.01)

(52) U.S. Cl. .......................... 714/18; 714/748

(58) Field of Classification Search .............. 714/4, 714/18, 46, 57, 712, 746–752, 762, 821, 714/748; 370/230, 235–236, 278, 282, 389–390, 370/473
See application file for complete search history.

(56) References Cited

U.S. PATENT DOCUMENTS

| | | | | |
|---|---|---|---|---|
| 6,594,798 B1 * | 7/2003 | Chou et al. | ................ | 714/820 |
| 6,609,167 B1 * | 8/2003 | Bastiani et al. | ............. | 710/104 |
| 6,735,200 B1 * | 5/2004 | Novaes | ........................ | 370/390 |
| 6,748,447 B1 * | 6/2004 | Basani et al. | ................ | 709/244 |
| 6,807,578 B1 * | 10/2004 | Satran et al. | ................ | 709/235 |
| 2002/0150094 A1 * | 10/2002 | Cheng et al. | ................ | 370/389 |

* cited by examiner

*Primary Examiner*—Dieu-Minh Le
(74) *Attorney, Agent, or Firm*—Weingarten, Schurgin, Gagnebin & Lebovici LLP

(57) ABSTRACT

Reliable multicast communication is provided by sending data from a transmitting device to receiving devices as "bursts" of data transfer units. Each receiving device provides status describing which data transfer units within each previously transmitted burst require retransmission. The transmitting device generates correction data based on this status information by determining a number of subsets of the data transfer units in the burst. Each data transfer unit subset must meet the following condition: if a data transfer unit is included in a given subset, for each receiving device in the group of receiving devices, that data transfer unit must be the only data transfer unit lost by that receiving device and included in that subset. The correction data for a given subset is obtained by applying an exclusive-OR (XOR) operation to all the data transfer units in the subset, and the output is sent to at least one of the receiving devices. Each correction data transfer unit includes the correction data itself, as well as a bit mask describing which data transfer units of the previously transmitted burst are within the subset associated with the correction data. Upon receiving a correction data transfer unit, a receiving device operates to restore a lost or damaged data transfer unit from the previously transmitted burst by applying an XOR operation to correction data in the correction data transfer unit and the correctly received data transfer units in the associated subset.

23 Claims, 8 Drawing Sheets

| STREAM ID 90 | ORIGINAL BURST NUMBER 92 | SUBSET MASK 94 | CORRECTION DATA AND OTHER FIELDS 96 |
|---|---|---|---|

CORRECTION DTU 88

*Fig. 3*

| STREAM ID 172 | BIT MASK FOR BURST 1 174 | BIT MASK FOR BURST 2 176 | ... | BIT MASK FOR BURST N 178 |

STATUS REPORT MESSAGE 170

*Fig. 6*

METHOD AND APPARATUS FOR RESTORATION OF LOST BLOCKS IN A MULTICAST DATA TRANSMISSION

CROSS REFERENCE TO RELATED APPLICATIONS

This application claims priority under 35 U.S.C. §119(e) to provisional patent application Ser. No. 60/335,996 filed Nov. 15, 2001.

STATEMENT REGARDING FEDERALLY SPONSORED RESEARCH OR DEVELOPMENT

N/A

BACKGROUND OF THE INVENTION

The present invention relates generally to communication protocols, and more specifically to a system for restoring lost or damaged data blocks within a multicast data transmission.

When a transmitting device sends data over various specific routes to multiple receiving devices, different data may be lost across the different routes, potentially resulting in the need to retransmit significant portions of the originally transmitted data. Such is the case for multicast transmissions, in which a single transmitter sends data to potentially thousands of receivers using one or more multicast destination addresses. In order to provide reliable communications, however, a system must be employed to efficiently enable receiving devices to obtain a correct copy of all transmitted information, even in the face of data loss within an underlying communication channel.

Existing systems have used various specific schemes to provide reliable delivery of data through multicast channels. One commonly used approach is known as Automatic Repeat Request (ARQ). In an ARQ based system, all data lost by at least one receiver is retransmitted to all receivers. Accordingly, ARQ based systems may require a large number of packets to be retransmitted even for relatively small loss rates in the individual communication channels.

Other existing multicast systems have attempted to provide error correction in a way that may reduce the total amount of retransmitted data. These existing approaches have operated based on the data lost by the receiving device having the worst case data loss, i.e. the receiver experiencing the highest loss rate. Such techniques include those based on Reed-Solomon codes, which are block-based error correcting codes. While generally effective, Reed-Solomon code correction systems require significant amounts of CPU power. In an application in which large amounts of data must be reliably transferred over a potentially lossy channel, such CPU overhead may easily become prohibitively expensive. Such existing systems also include what is generally referred to as the "Tornado codes" approach, which involves applying exclusive-OR (XOR) operations across randomly selected data subsets to generate error correction data. The Tornado codes approach is relatively fast in terms of computations, and may be used with relatively large sets of data. However, some Tornado codes based solutions are proprietary, and may not be available for use in all instances.

It would therefore be desirable to have a system for providing reliable data transmission in a multicast communication environment which does not base its data correction on loss estimates or previous measurements of data loss. The system should further require fewer computational resources than is needed by Reed-Solomon systems, and limit the amount of data that must be transmitted in the face of data loss.

SUMMARY OF THE INVENTION

In accordance with the present invention, a system and a method are disclosed for providing reliable multicast communication using receiver state information to minimize the correction data sent from a transmitting device to multiple receiving devices. In the disclosed system, data is sent from the transmitting device to the receiving devices as sets of data transfer units, referred to as "bursts." Each receiving device provides status information in status report messages describing which data transfer units within each previously transmitted burst require retransmission. The transmitting device uses this status information to generate correction data that is included in correction data transfer units that the transmitting device transmits to the receiving devices.

Specifically, for each previously transmitted burst of data transfer units, the transmitting device may generate a number of subsets of the data transfer units in the burst to use in forming correction information. Each data transfer unit subset must meet the following condition: if a data transfer unit is included in a given subset, for each receiving device, that data transfer unit must be the only data transfer unit lost by that receiving device and included in that subset. The transmitting device then generates correction data for each of the subsets. The correction data for a given subset is obtained by applying an exclusive-OR (XOR) operation across all data transfer units in the subset. The output of the XOR operation is correction data that is transmitted in a correction DTU to one or more of the receiving devices. Each correction data transfer unit includes the correction data itself, as well as a bit mask describing which data transfer units of the previously transmitted burst are within the subset associated with the correction data in the correction data unit.

Upon receiving a correction data transfer unit, a receiving device operates to restore a lost or damaged data transfer unit from the previously transmitted burst indicated in the correction data transfer unit. The receiving device performs the restoration by applying an XOR operation to the correction data in the correction data transfer unit and the correctly received data transfer units in the associated subset. The process in the transmitting device used to generate the correction data ensures that there is at most only one lost or damaged data transfer unit in the receiving device for a given subset. The result of the XOR operation is a restored copy of the lost or damaged data transfer unit.

The disclosed system requires relatively little correction data to recover lost or damaged data transfer units from a previously transmitted burst. Moreover, the disclosed system operates to accomplish this with very low CPU consumption.

BRIEF DESCRIPTION OF THE SEVERAL VIEWS OF THE DRAWINGS

The invention will be more fully understood by reference to the following detailed description of the invention in conjunction with the drawings, of which:

FIG. 3 is a block diagram illustrating fields within a correction data transfer unit;

FIG. 6 is a block diagram showing fields in a status report message;

DETAILED DESCRIPTION OF THE INVENTION

All disclosures of U.S. provisional patent application No. 60/335,996, filed Nov. 15, 2001, and entitled "Method and Apparatus for Encoding Error Correction Data," are hereby incorporated herein by reference.

Figure 1:
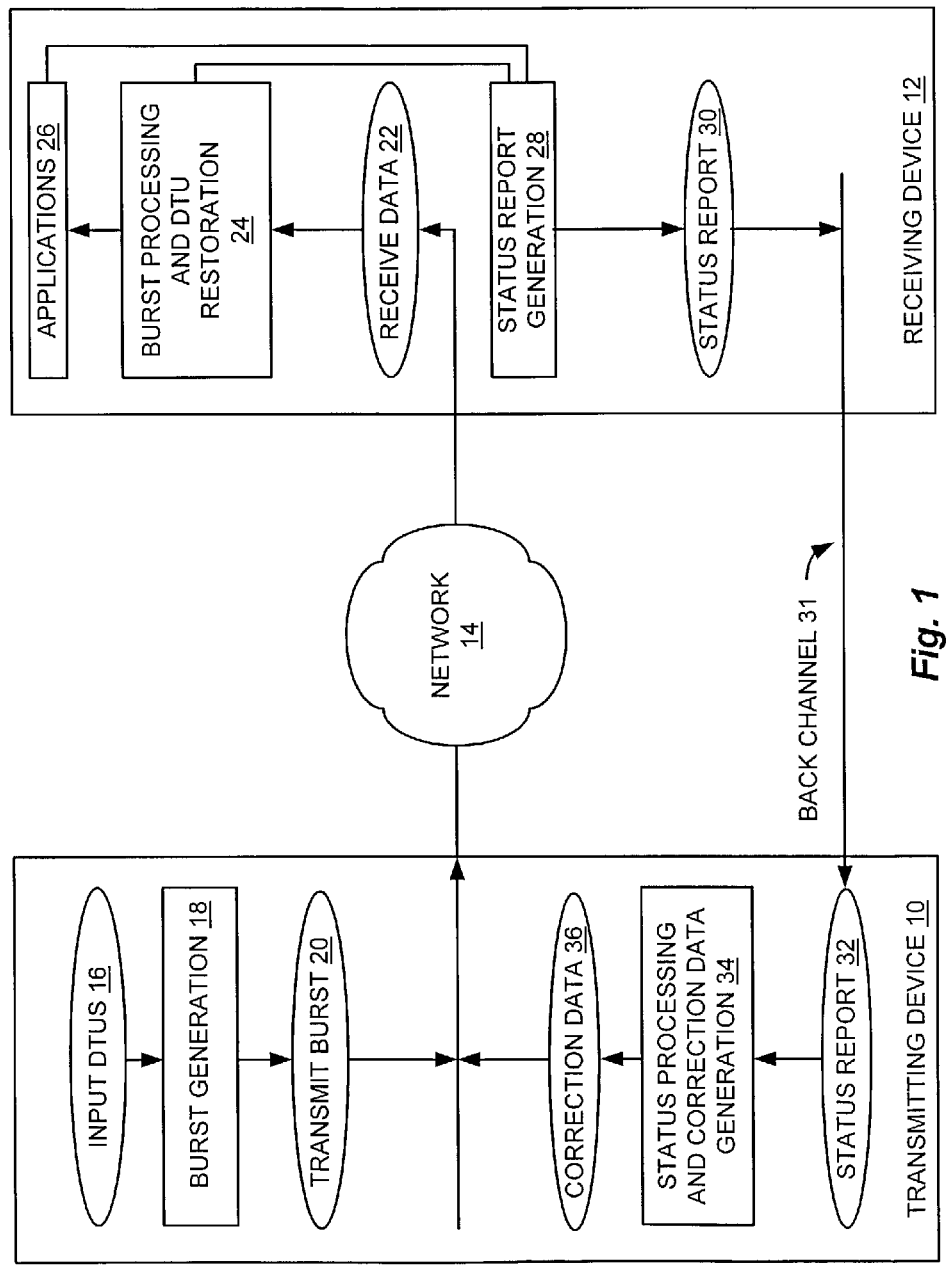
FIG. 1 is a block diagram showing a transmitting device and a receiving device communicating over a communication network.

FIG. 1 shows a transmitting device 10 and a receiving device 12 attached to a network 14. The transmitting device 10 and/or receiving device 12, for example, may each be any type of network attached device, such as server computer systems, personal computers, workstations, or other devices capable of communicating over a communication network. The transmitting device 10 and/or receiving device 12 may accordingly each include one or more processors, as well as computer program storage for storing computer program code that is executable on such processors. The transmitting device 10 and receiving device 12 may each further include various input/output interfaces, including network interfaces to the network 14. The network 14 may be embodied using any appropriate communication media, and be based on conventional underlying networking protocols which enable the transfer of information between the transmitting device 10 and the receiving device 12. In one embodiment, the network 14 is a communication satellite based network over which the transmitting device 10 communicates with multiple receiving devices, such as the receiving device 12, using multicast or group destination addresses. Further for purposes of illustration, the network 14 may employ an underlying communication protocol such as TCP/IP or the like to support various layers of communication among the devices to which it is attached.

During operation of the devices shown in FIG. 1, data transfer units (DTUs) 16 are input to the burst generation component 18 of the transmitting device. The disclosed system may use any specific kind of DTU, including what are generally referred to as frames, packets, datagrams, cells, or other specific types of data units suitable for transfer across the network 14. The burst generation processing component 18 may, for example, be embodied using any appropriate combination of software code and/or programmable or custom hardware based technology. The burst generation component 18 operates to organize the DTUs it is provided into reliably delivered sets of DTUs, referred to herein as "bursts", that are stored in memory within the transmitting device 10 by the burst generation component 18. Multiple bursts may be processed simultaneously in both the transmitting device and the receiving device(s). The input DTUs may be provided to the burst generation component 18 continuously, periodically, or as needed by application programs executing on the transmitting device 10.

The burst generation component 18 operates to continuously process the input DTUs 16 to produce a stream of transmit bursts, shown for purposes of illustration as transmit burst 20, that are stored within the transmitting device 10 for subsequent transmission. Multiple transmit bursts may be processed simultaneously in the transmitting device 10. Any specific number or range of numbers of transmit bursts may be processed simultaneously by a transmitting device in a specific embodiment. In one embodiment, the transmit bursts processed simultaneously in the transmit device are each stored for generation of correction data until all DTUs within them have been received correctly at all receiving devices. In the even that a DTU is indicated as having been lost or damaged by at least one receiving device, or has not been acknowledged after some predetermined time limit, the disclosed system can generate correction data that can be transmitted to that receiving device. These simultaneously processed transmit bursts stored in the memory of the transmitting device 10 are referred to herein as "outstanding" bursts until their complete and correct receipt has been confirmed by all receiving devices to which they are transmitted. As shown in FIG. 1, the transmit burst 20 is transmitted from the transmitting device 10, over the network 14, to the receiving device 12.

The receiving device 12 receives receive data 22, and passes it to the burst processing and DTU restoration component 22. The receive data 22 may consist of a burst of DTUs, such as the transmit burst 20, and/or some number of correction DTUs containing correction data with regard to damaged or lost DTUs in a previous burst. Like the transmitting device 10, the receiving device 12 may process multiple bursts simultaneously. In other words, if one or more DTUs of a given burst are either missing or damaged, the receiving device nevertheless continues processing subsequent bursts to determine whether the DTUs within them have been received correctly, and to pass correctly received bursts or portions of bursts to higher software layers, such as application programs 26 executing on the receiving device 12.

The burst processing and DTU restoration component 22 may be embodied using any appropriate combination of software code and/or programmable or custom hardware based technology. The burst processing and DTU restoration component 22 operates to identify any data DTUs within a received burst that have been lost or damaged, and to restore any such lost or damaged DTUs, using correction data from the transmitting device 10. The burst processing and DTU restoration component 24 determines which DTUs within a received burst have been correctly received, and passes on a description of any lost or damaged DTUs to the status report generating component 28. The application programs 26 also operate to report the processing status of each DTU to the status report generating component 28.

In parallel with the operation of the burst processing and DTU restoration component 24 and the application programs 26, the status report generating component 28 processes information regarding correct delivery and completed processing of received DTUs in order to generate a continuous stream of status report messages, such as the status reports 30 shown in FIG. 1. The receiving device 12 further operates to continuously transmit status reports to the transmitting device 10, where received status reports are shown as the received status report 32. The status reports may be conveyed to the transmitting device 10 using any appropriate type of message format, such as a burst, single DTU, or other type of message. In a first embodiment, the status reports are conveyed from the receiving device 12 to the transmitting device 10 over a back channel 31, separate from the network 14 over which data bursts and correction DTUs are sent from the transmitting device 10 to the receiving device 12. In the case where the network 14 is a communication satellite based network over which the transmitting device 10 communicates with multiple receiving devices, the back channel 31 may be provided using a relatively low bandwidth, high latency communication service, for example over the Internet. In such an embodiment, the status report messages are provided via TCP/IP packets sent by the receiving device 12 to the transmitting device. Alternatively, the status reports may be sent to the transmitting device 10 using the same network over which the data bursts are conveyed to the receiving device 12.

When the status reports, such as status report 32, are received by the transmitting device 10, they are passed to the status processing and correction data generation component 34. The status processing and correction data generation component 34 examines the received status reports to determine which previously transmitted DTUs were not correctly received at which receiving devices, in order to generate correction data to be transmitted from the transmitting device 10. The set of outstanding bursts stored in memory of the transmitting device include all those DTUs for which correction data may be needed. Accordingly, until the correct receipt of every DTU in a given burst is confirmed from each receiving device to which the burst was transmitted, that burst is considered an outstanding burst and stored in the transmitting device 10 for use in generating correction data.

Multiple status reports may be processed simultaneously by the status processing component 34. The correction data generated by the status processing and correction data generation component 34 is shown as correction data 36, and may be transmitted over the network 14 to the receiving device 12 in the form of one or more correction data transfer units. Upon receipt of the correction data 36 by the receiving device 12, previously sent DTUs that were damaged or lost are restored and delivered to relevant application programs as necessary. Subsequent status reports from the receiving device 12 may accordingly reflect the correct receipt and completed processing status of such restored data. The status processing and correction data generation component 34 may be embodied using any appropriate combination of software code and/or programmable or custom hardware based technology for a given implementation.

While for purposes of concise illustration a single receiving device 12 is shown in FIG. 1, the disclosed system is advantageously applicable where a single transmitting device 10 operates to transmit individual bursts that are each received by multiple receiving devices. For example, such may be the case where multicast destination addresses are employed by the transmitting device. In the case where multiple receiving devices receive the bursts transmitted by the transmitting device, the structure and operation described herein with reference to receiving device 12 may be applicable to any or all such multiple receiving devices.

Figure 2:
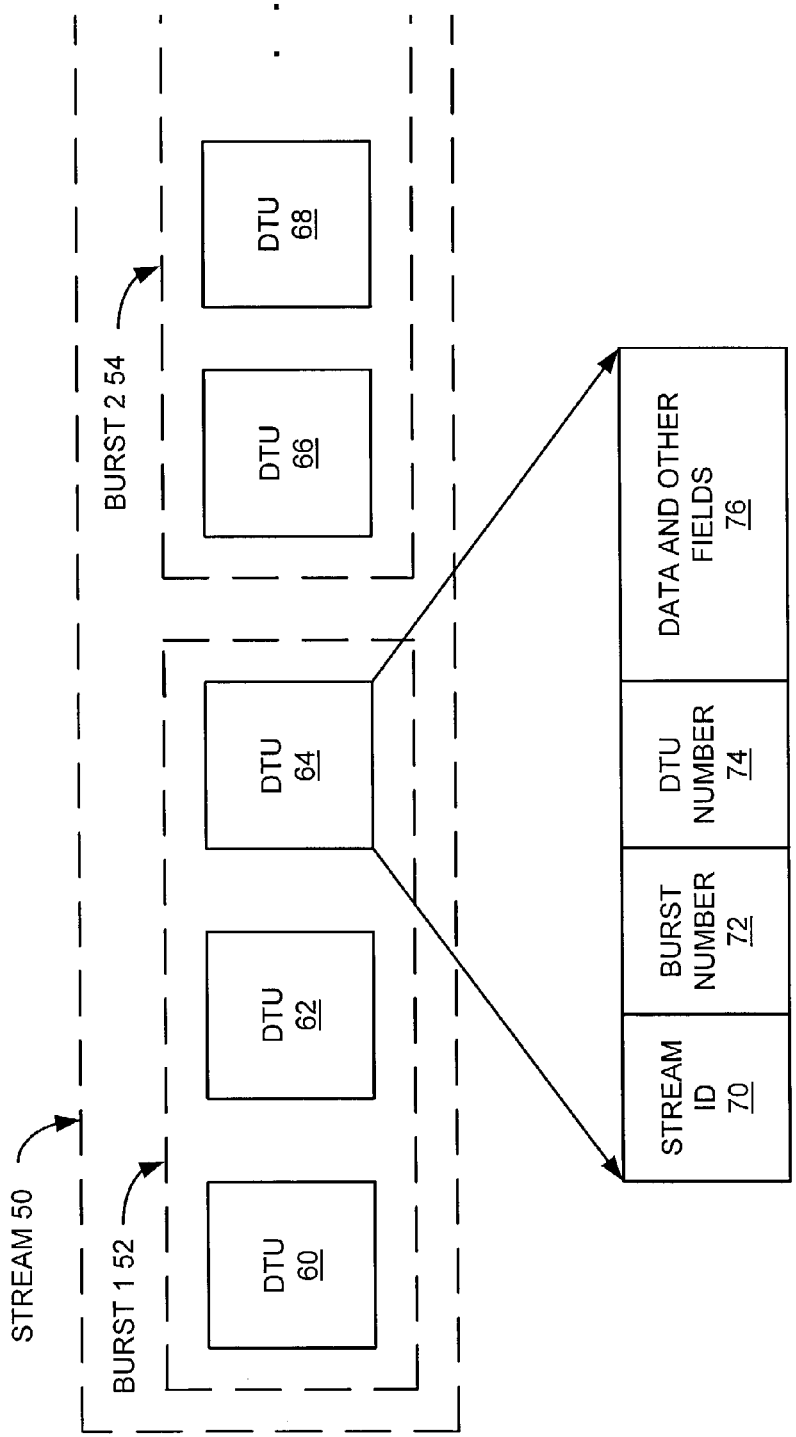
FIG. 2 is a block diagram illustrating the organization of bursts within a data stream, data transfer units within a burst, and fields within a data transfer unit.

FIG. 2 shows an example of a data stream 50 including a series of bursts, shown as burst 1 52 and burst 2 54. The stream 50 represents the communication of a contiguous stream of data from a transmitting device to multiple receiving devices, for example using multicast addressing, as in the case of a streaming media server application. A data stream such as the data stream 50 may include any number of bursts. Each of the bursts within the data stream 50 includes a series of multiple DTUs, shown as DTU 60, DTU 62 and DTU 64 in burst 1 52, and as DTU 66 and DTU 68 in burst 2 54. An example of fields for a DTU is shown with regard to DTU 64. The illustrative DTU fields are shown as including a stream ID 70, which identifies the data stream that includes the DTU, a burst number 72 that identifies the position of the burst containing the DTU within the stream, and a DTU number 74 that identifies the position of the DTU within the burst that contains it. The DTU 64 is further shown to include data and other fields 76.

FIG. 3 shows an example of a format for a correction DTU 88 that is used to convey correction data from a transmitting device to one or more receiving devices. The correction DTU is shown including a stream ID 90, which identifies the stream associated with the correction data in the correction DTU 88. An original burst number 92 identifies the position or offset of a burst within the stream identified by the stream ID 90. The burst indicated by the original burst number field 92 is the burst that is associated with the correction data conveyed in the correction DTU 88. A subset mask field 94 includes a bit mask indicating positions of DTUs within the burst identified by the original burst number field 92. The DTUs identified by the subset mask field 94 are the DTUs that make up the subset of DTUs within that burst that are associated with the correction data in the correction DTU 88. The correction DTU 88 is further shown including the correction data associated with the DTU subset and other fields 96. Those skilled in the art will recognize that the format shown in FIG. 3 may be modified in terms of the location and/or contents of specific fields within the correction DTU. Accordingly, while a specific layout for a correction DTU is shown in FIG. 3, the present invention is not so limited, and other specific formats may be employed consistent with the present invention.

Figure 4:
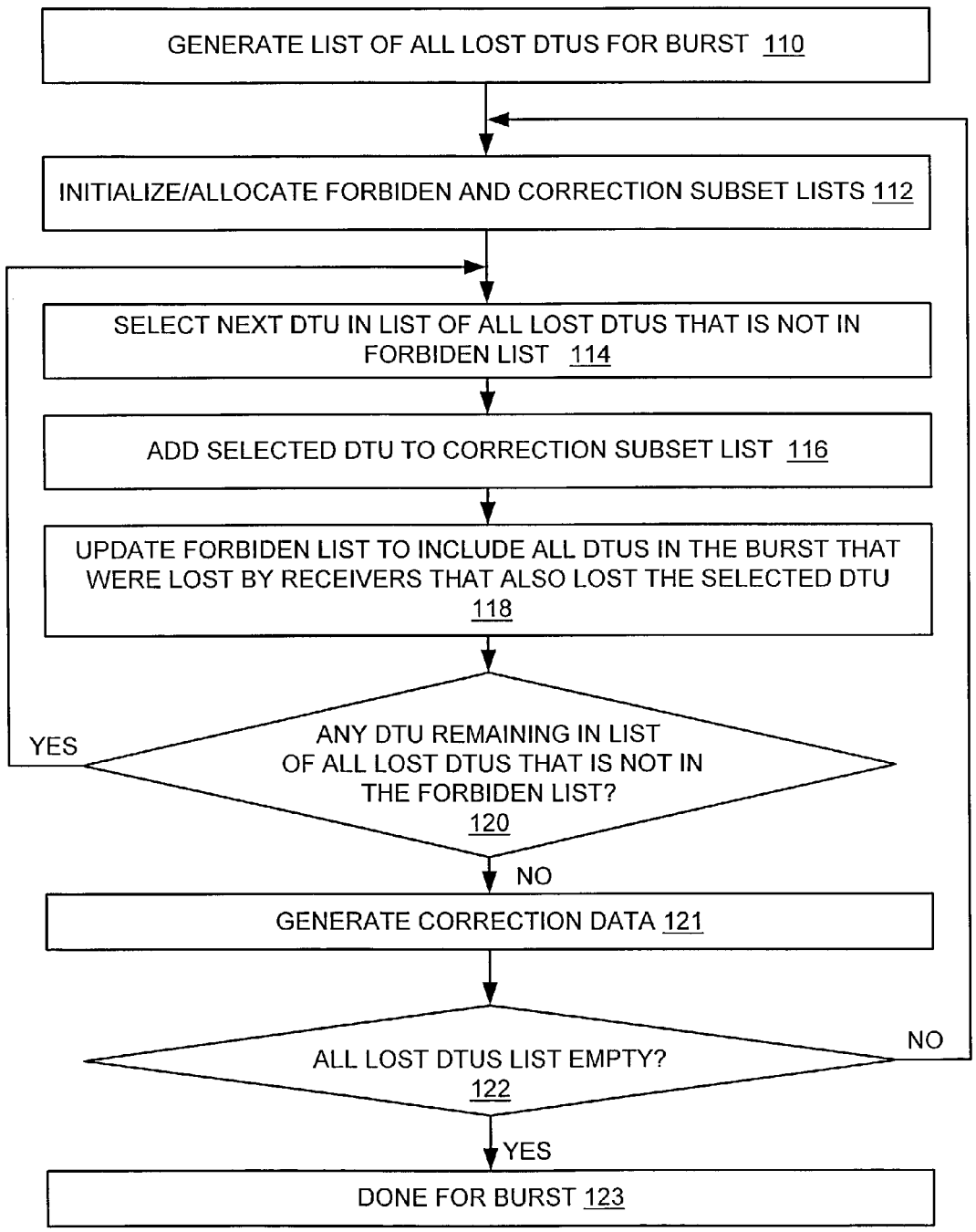
FIG. 4 is a flow chart showing steps performed by an illustrative embodiment in a transmitting device.

Now with reference to FIG. 4, the steps performed to generate correction data in an illustrative embodiment of a transmitting device are described. The steps of FIG. 4 may, for example, be performed in part or in whole by the status processing and correction data generation component 34 shown in FIG. 1. At step 110, the disclosed system generates a list of all lost DTUs, across all receiving devices, for a previously transmitted burst. The list generated in step 110 is derived from information included in status report messages received from the receiving devices to which the previously transmitted burst was addressed. The list generated at step 110 may be stored, for example, as a bit mask indicating the positions of the lost or damaged DTUs in the previously transmitted burst.

At step 112 of FIG. 4, the disclosed system initializes and/or allocates a forbidden list and a correction subset list. The lists operated on at step 112 may also be represented as bit masks having bits associated with corresponding positions in the previously transmitted burst. For example, step 112 may result in two bit masks initialized to all clear bits, individual ones of which may subsequently be set as DTUs are added to each list.

At step 114, the disclosed system selects a DTU from the list of all lost DTUs that is not contained in the forbidden list. At step 116, the DTU selected at step 114 is added to the correction subset list. The forbidden list is then updated at step 118 to include all DTUs in the previously transmitted burst that were lost by any receiving device that also lost the DTU selected at step 114. The disclosed system then checks at step 120 to determine whether the list of all lost DTUs includes any DTUs that have not yet been selected at step, and that have not yet been added to the forbidden list. If there are any such remaining DTUs in the list of all lost DTUs, then step 120 is followed by step 114. Otherwise, step 120 is followed by step 121, in which the correction data is generated based on the DTUs from the previously transmitted burst that are indicated by the correction subset list. For example, the correction data generated at step 121 may be the result of an exclusive-OR operation performed across those DTUs from the previously transmitted burst that are indicated by the correction subset list. Such correction data is associated with the DTU subset indicated by the correction subset list. Accordingly, the correction subset list may be included with the correction data, for example within a correction DTU, to indicate to the receiving devices which DTUs of the previously transmitted burst are within the subset associated with the correction data in the correction DTU. Those skilled in the art will recognize that the correction data generated at step 121 may be provided immediately to one or more of the receiving devices, or may be stored for subsequent delivery as may be appropriate for a specific embodiment or execution environment. In the case where step 120 is followed by step 114, the disclosed system continues through the list of all lost DTUs until there are no more DTUs within the list of all lost DTUs that are not within the forbidden list. In the illustrative embodiment, when a DTU is selected at step 114, it is removed from the list of all lost DTUs, for example by clearing the bit associated with that DTU in a bit mask representing the list of all lost DTUs.

At step 122, the disclosed system determines whether all DTUs have been removed from the list of all lost DTUs, for example by determining if there are any set bits remaining in the bit mask representing the list of all lost DTUs. If all DTUs have been removed from the list of all lost DTUs, then processing of the previously transmitted burst is complete, as indicated at step 123. The disclosed system may then proceed to process another previously transmitted burst. Otherwise, if there remains one or more DTUs on the list of all lost DTUs, then step 122 is followed by step 112, in which the forbidden and correction subset lists are reinitialized, and the process continues.

A specific example of operation is now described. Assuming that a number of receiving devices lost different DTUs within a previously transmitted burst, as follows:

| DTU #: | 0 | 1 | 2 | 3 | 4 | 5 | 6 | 7 | 8 | 9 |
|---|---|---|---|---|---|---|---|---|---|---|
| Receiving Device 0: | x | 0 | 0 | 0 | x | 0 | 0 | 0 | 0 | 0 |
| Receiving Device 1: | 0 | 0 | 0 | 0 | 0 | 0 | x | 0 | 0 | 0 |
| Receiving Device 2: | 0 | 0 | x | 0 | 0 | 0 | 0 | 0 | x | 0 |
| Receiving Device 3: | 0 | x | 0 | 0 | 0 | 0 | x | 0 | 0 | 0 |

Where each line above represents the receipt status of a single associated receiving device, where '0' represents successfully delivered data packet and 'x' represents lost or damaged packet that must be restored. Upon receipt of this information, the transmitting device generates subsets as follows ('x' indicating a DTU within the burst that is included within the identified subset):

| DTU #: | 0 | 1 | 2 | 3 | 4 | 5 | 6 | 7 | 8 | 9 |
|---|---|---|---|---|---|---|---|---|---|---|
| Subset 0: | x | x | x | 0 | 0 | 0 | 0 | 0 | 0 | 0 |
| Subset 1: | 0 | 0 | 0 | 0 | x | 0 | x | 0 | x | 0 |

The above subsets meet the condition that if some packet is included into some subset, for each receiving device it must be the only packet lost by that receiving device and included into that subset. Correction data is then generated for each subset by applying a logical XOR operation to all DTUs included in the subset. Then, for example, correction data for each of the subsets is transmitted in one or more correction DTUs through a multicast communication channel to all of the receiving devices. As described in connection with FIG. 3 above, each correction DTU, in addition to the correction data itself, contains a bit mask representing which DTUs of the previously transmitted burst are within the subset corresponding to the correction data in that correction DTU. Upon receiving a correction DTU, a receiving device may restore some lost DTU from the associated burst, for example by applying an XOR operation to the correction data and to other correctly received DTUs in the corresponding subset. The transmitting device process ensures that no more than one DTU of the subset have been lost by any one receiving device. The result of the XOR operation is the restored DTU. In the above example, the correction data associated with subset 0 enables restoration of DTU 0 by receiving device 0, DTU 1 on receiving device 3 and DTU 2 on receiving device 2. Similarly, the correction data associated with subset 1 enables restoration of DTU 4 on receiving device 0, DTU 6 on receiving devices 1 and 3, and DTU 8 on receiving device 2. In this example, the transmitting device need only transmit two correction DTUs instead of six which would be needed if all lost or damaged DTUs were simply retransmitted.

While various specific methods may be used to generate subsets meeting the above condition and covering all lost packets, the above operational example is now further used to explain the illustrative embodiment of FIG. 4. In step 110 of FIG. 4, for example, all lost DTUs across all receiving devices are combined into an 'AllLosses' list, resulting in the following from the above example:

AllLosses: x x x 0 x 0 x 0 x 0

Then, at step 112, the transmitting device generates an empty 'Forbidden' list and an empty 'SubSet' set. At step 114, the transmitting device selects the first sequential DTU from the 'AllLosses' list that is not included in 'Forbidden' list. This selected DTU is then included into the 'SubSet' list at step 116, and removed from 'AllLosses'. In the example above, the first DTU selected is DTU #0, and the resulting 'SubSet' list is:

SubSet: x 0 0 0 0 0 0 0 0 0

At step 118 the transmitting device combines all DTUs that were either lost or damaged at receiving devices that also lost the selected DTU (DTU #0), and adds these DTUs to the 'Forbidden' list. In the example above, such receiving devices include receiving device #0, and the resulting 'Forbidden' list is:

Forbidden: x 0 0 0 x 0 0 0 0 0

Steps 114, 116 and 118 are then repeated until no DTU can be added to the correction subset. In this example, the 'SubSet' list is generated as:

Subset 0: x x x 0 0 0 0 0 0 0

Steps 112, 114, 116 and 118 are then repeated until the 'AllLosses' list is empty. This produces the second subset from the above example:

Subset 1: 0 0 0 0 x 0 x 0 x 0

Those skilled in the art will recognize that other specific processes may be employed to derive the DTU subsets of the present system. Accordingly, while the steps in FIG. 4 are one possible embodiment, the present invention is not limited to the steps in FIG. 4, and alternative approaches may be used to generate the DTU subsets described herein.

Figure 5:
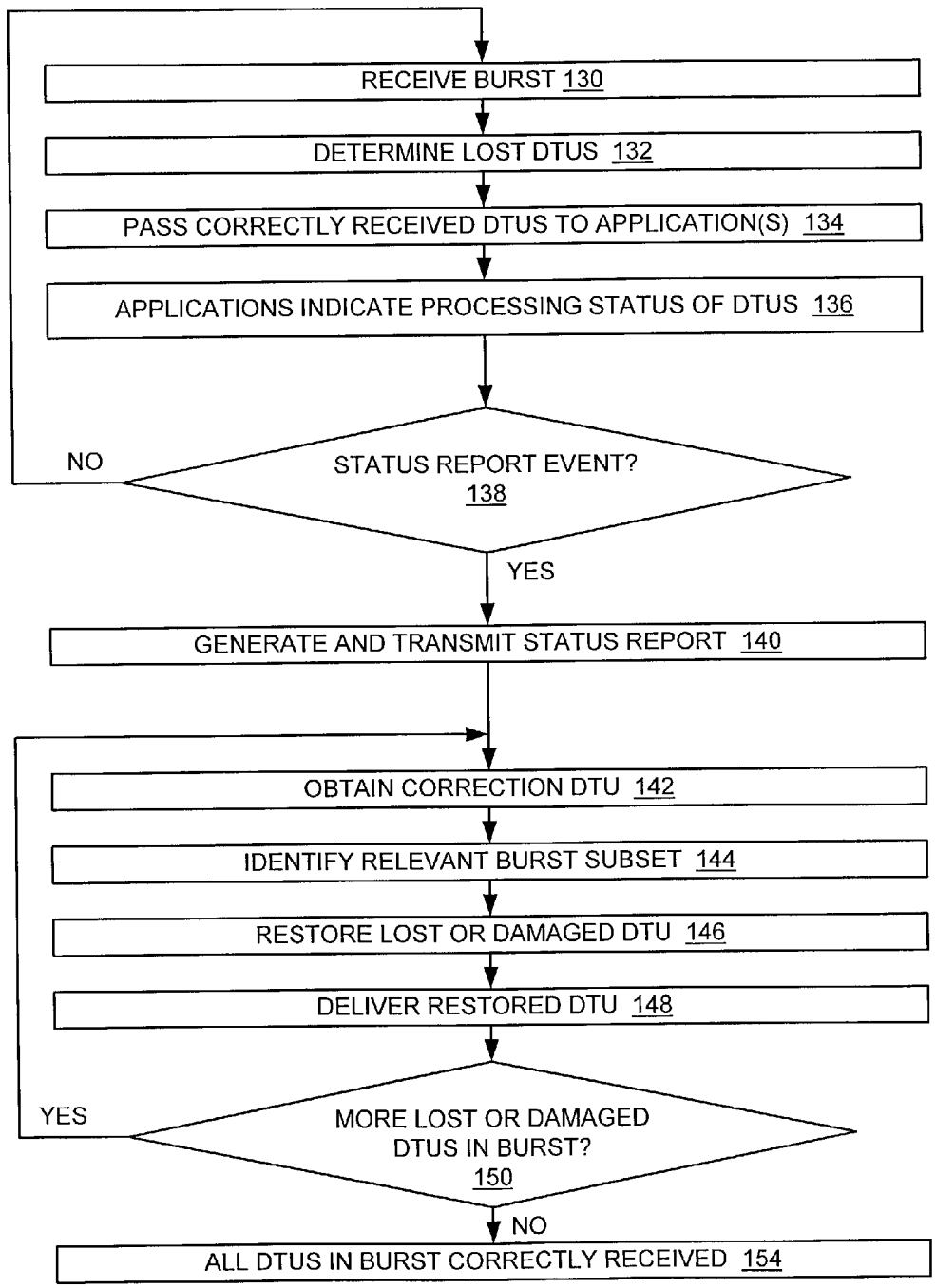
FIG. 5 is a flow chart showing steps performed by an illustrative embodiment in a receiving device.

FIG. 5 is a flow chart illustrating steps performed in a receiving device of an illustrative embodiment of the disclosed system. At step 130 the receiving device receives a burst, and then determines at step 132 which, if any, DTUs in the burst were lost or damaged. Determination of lost or damaged DTUs may, for example, be performed using information within the burst, such as burst numbers, and/or conventional data integrity checks on each DTU, such as cyclic redundancy code (CRC) checks. The receiving device maintains the location of each lost or damaged DTU in the burst for subsequent transmission in a status report. At step 134, the receiving device passes successfully received DTUs from the received burst to one or more associated application programs. The application programs in turn record or provide indication of the processing status of each DTU they are passed for use when forming status reports.

At step 138, the receiving device determines whether an event has occurred indicating that a status report should be transmitted to the transmitting device. In one embodiment, for example, a status report is generated and transmitted to the transmitting device in the event the end of a received burst is detected by the receiving device. Alternatively, or in addition, status reports may be generated and/or transmitted in the event that a status request message is received from the transmitting device. While no events triggering generation of a status report are detected, step 138 is followed by step 130, indicating the continued receipt of bursts by the receiving device.

In the event a status report is triggered by an event detected at step 138, at step 140 at least one status report is generated and transmitted to the transmitting device. The status report includes information indicating both the DTUs that require transmission within all previously received bursts, as well as the processing status of all DTUs in previously received bursts. The format of the status report generated at step 140 is, for example, the format described below in connection with FIG. 6. In response to indication of lost DTUs in the status report generated and transmitted at step 140, the receiving device will receive correction data at step 142, which can then be used to restore previously lost or damaged DTUs. In this regard, at step 144, the receiving device determines a subset of a previously delivered burst that is associated with the correction data obtained at step 142. For example, in the case where the correction data was received in a correction DTU, then the associated DTU subset would be indicated in the correction DTU. The receiving device then performs an exclusive-OR operation across the correction data and the correctly received DTUs in the DTU subset associated with the correction data to obtain a restored copy of a lost or damaged DTU at step 146. Because of the way the correction data is generated in the transmitting device, for any given set of correction data obtained at step 142, the receiving device will have lost no more than one DTU within the burst subset associated with the correction data. The restored DTU can then be delivered to one of the application programs executing on the receiving device at step 148. At step 150, the receiving device determines whether there are any further lost or damaged DTUs in the previously delivered burst associated with the correction data obtained at step 142. If so, then step 150 is followed by step 142, in which the process continues to obtain further correction data for restoring such other lost or damaged DTUs. If all lost or damaged DTUs within the burst have been restored, then at step 154 the disclosed system determines that the burst has been correctly received in its entirety.

Those skilled in the art will recognize that the order of the steps shown in FIG. 5 is just one possible ordering, and that a given implementation or series of events may result in a different specific ordering. In particular, parallelism may be provided such that component functionality implementing two or more of the steps in FIG. 5 may allow those steps to be performed concurrently for purposes of efficiency and/or performance.

FIG. 6 shows an illustrative format for a status report message 170 that conveys receipt status regarding DTUs in one or more bursts for a receiving device. The stream ID field 172 identifies a data stream associated with the status report 170, such as a streaming media file being conveyed from a server in a transmitting device to multiple receiving devices. The stream ID field 172 is followed by a series of bit masks associated with previously received bursts within the stream, shown as bit mask for burst 1 174, bit mask for burst 2 176, through bit mask for burst N 178, where burst N is the last burst received at the receiving device when the status report 170 was generated. In on embodiment, the values of the bit masks for each burst in the status report 170 include bits corresponding to each DTU in each of the bursts. The bit values in the bit maps indicate the status of each DTU within each burst. For example, a first bit value may indicate that the corresponding DTU was correctly received, while a second bit value indicates that the corresponding DTU was either lost or damaged. Moreover, a burst number may be provided in combination with each of the bit masks following the stream ID field 174. In the event that all DTUs within a burst have been correctly received at the receiving device, the burst number for that burst would be followed by a bit mask including all bits indicating correct receipt of the corresponding DTUs. Further, in the event that all DTUs within the burst have been correctly received and processed by associated application programs on the receiving devices, the bit mask may be omitted entirely, thus indicating the processing status of the DTUs in that burst within the status report 170.

In a preferred embodiment, the disclosed system operates in an environment in which file and/or streaming media content delivery is provided from a transmitting device to multiple receiving devices. For example, data may be delivered using the disclosed system over a multicast enabled network, such as a multicast enabled communication satellite-based communication network. Also in a preferred embodiment, status reports indicating whether the transmitted data was received correctly may be sent over a separate back-channel communication system, for example as provided over the Internet.

As shown in FIG. 2, a burst may not include header information other than that associated with each DTU. Specifically, the association of DTUs into a burst is accomplished through the information contained in the burst number field 72 of each DTU contained in the burst. Further, the structure of each burst, in terms of the positions of the DTUs it contains, is described in the DTU number field 74. Accordingly, the burst "header" may be thought of as being distributed across the DTUs included within the burst.

Figure 7:
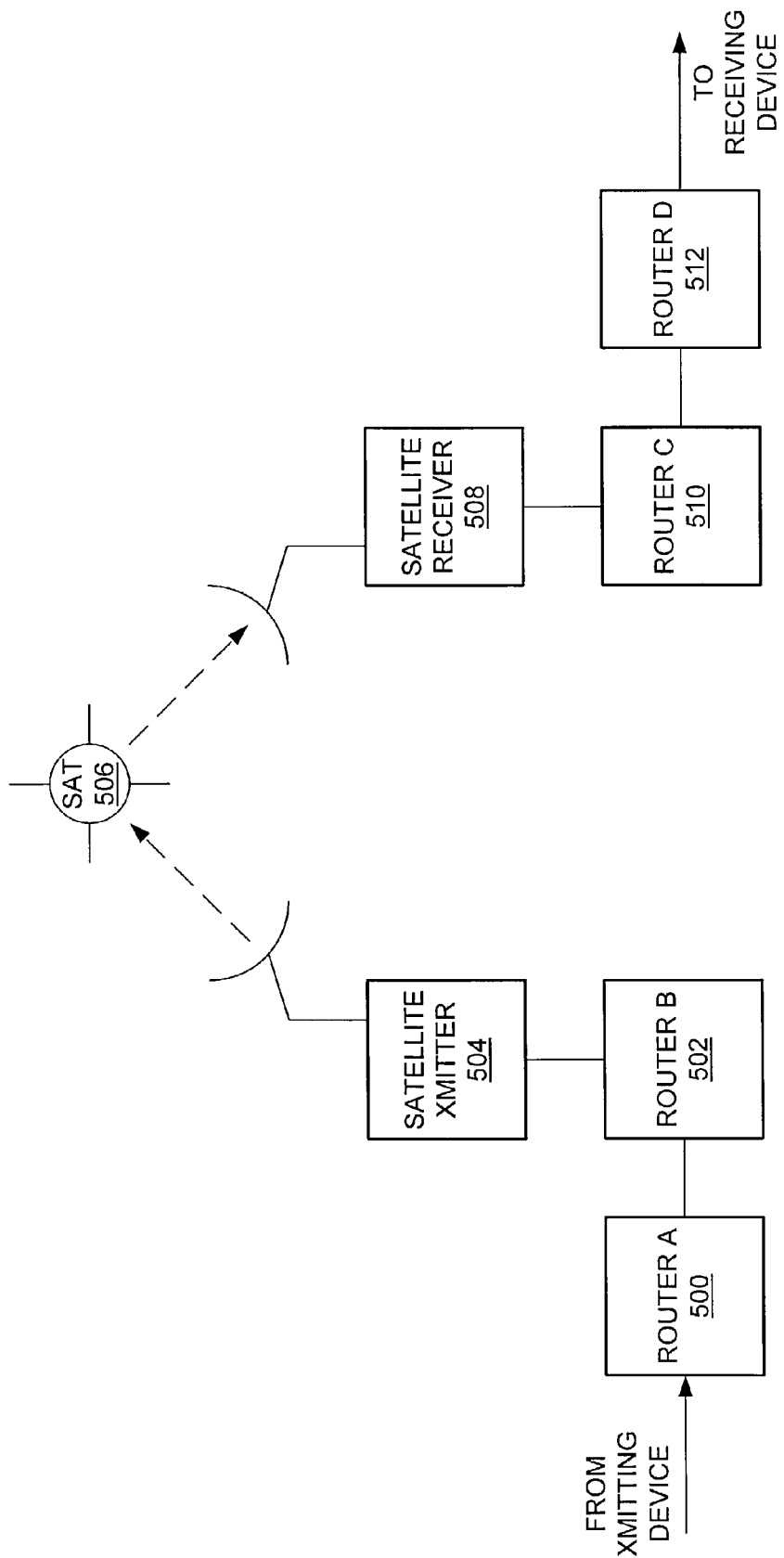
FIG. 7 shows an example configuration of the network 14 in FIG. 1.

FIG. 7 is a block diagram showing an example of a network over which data may be communicated using an embodiment of the disclosed system. The network illustrated in FIG. 7 is an example of the network 14 shown in FIG. 1. As shown in FIG. 7, data from a transmitting device passes through a Router A 500, to a Router B 502, and then to a Satellite Transmitter 504, which forwards the data to a Communications Satellite 506. The data is then passed by the Communications Satellite 506 to a Satellite Receiver 508, from which the data is passed through Router C 510 and Router D 512 to one or more receiving devices. The routers shown in FIG. 7 operate over an underlying communications network for which an MTU (Maximum Transmission Unit, Maximum Transfer Unit) may be predefined. The MTU for such a communications network is the largest frame size that can be transmitted over the network. Messages longer than the MTU must be divided into smaller frames. Typically, the layer 3 protocol (IP, IPX, etc.) extracts the MTU from the layer 2 protocol (Ethernet, FDDI, etc.), fragments the messages into that frame size and makes them available to the lower layer for transmission.

Figure 8:
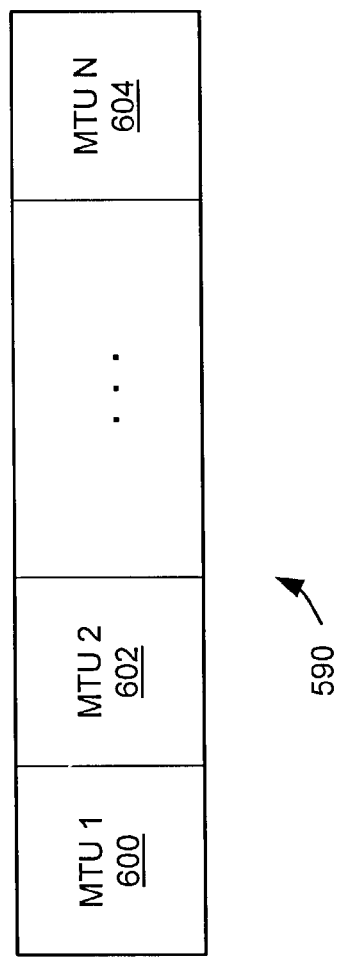
FIG. 8 shows an example of the data and other fields portion 76 of a DTU as shown in FIG. 2.

FIG. 8 shows how the contents of an individual DTU may be configured to reflect the MTUs used in an underlying network such as the communications network shown in FIG. 7. As shown in FIG. 2, the format of a DTU may include a data and other fields portion 76. FIG. 8 shows an example of the format of the data and other fields portion of the DTU. The format shown in FIG. 8 includes one or more MTUs, including an MTU 1 600, MTU 2, 602, through MTU N 604. In this way, the size of the DTU may be advantageously determined to reflect the size of MTU within the underlying network. As a result, bandwidth utilization is improved. In specific embodiments or operational environments, the contents of each DTU may therefore consist of one or more Ethernet packets, or one or more IP packets.

The DTU size for a given embodiment may further be configured as a function of the loss rate of the underlying network. In this approach, smaller DTU sizes would be used when the underlying network provides more unreliable performance. Accordingly, for higher loss rates, smaller DTUs would be used, thus making relatively frequent retransmission of data more efficient, since less successfully received data would necessarily be included in each retransmission.

Those skilled in the art should readily appreciate that programs defining the functions of the disclosed system and method can be implemented in software and delivered to a system for execution in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using baseband signaling or broadband signaling techniques, including carrier wave signaling techniques, such as over computer or telephone networks via a modem. In addition, while the illustrative embodiments may be implemented in computer software, the functions within the illustrative embodiments may alternatively be embodied in part or in whole using hardware components such as Application Specific Integrated Circuits, Field Programmable Gate Arrays, or other hardware, or in some combination of hardware components and software components.

What is claimed is:

1. A method for providing correction data from a transmitting device to a plurality of receiving devices, comprising:

generating at least one subset of a previously transmitted set of data transfer units, wherein said subset includes a plurality of said previously transmitted set of data transfer units, wherein at most one of said data transfer units included in said subset was not correctly received by any one of said plurality of receiving devices;

generating correction data from said at least one subset of said previously transmitted set of data transfer units; and transmitting said correction data to at least one of said plurality of receiving devices.

2. The method of claim 1, further comprising generating a list of those data transfer units within said previously transmitted set of data transfer units that were not correctly received.

3. The method of claim 2, further comprising:

receiving at least one status report message from at least one of said plurality of receiving devices; and wherein said generating said list of those data transfer units within said previously transmitted set of data transfer units that were not correctly received is responsive to said at least one status report message.

4. The method of claim 3, wherein each said status report message identifies a number of data transfer units within said previously transmitted set of data transfer units that were not correctly received by a corresponding one of said plurality of receiving devices.

5. The method of claim 1, wherein said generating correction data from said at least one subset of said previously transmitted set of data transfer units comprises applying a logical exclusive-OR operation to said data transfer units included in said subset of said previously transmitted set of data transfer units.

6. The method of claim 1, wherein said transmitting said correction data to at least one of said plurality of receiving devices comprises transmitting at least one data correction data transfer unit to said plurality of receiving devices.

7. The method of claim 6, wherein said transmitting said at least one data correction data transfer unit further comprises storing an identification of each of said plurality of said previously transmitted data transfer units included in said subset in said data correction data transfer unit.

8. The method of claim 7, wherein said storing said identification of each of said plurality of said previously transmitted data transfer units included in said subset comprises setting or clearing a bit in a bit mask.

9. The method of claim 7, wherein said transmitting said at least one data correction data transfer unit further comprises storing an identification of said subset of previously transmitted data transfer units in said data correction data transfer unit.

10. The method of claim 1, wherein said set of previously transmitted data transfer units comprises multicast data transfer units including at least one multicast destination address.

11. A network device for providing correction data to a plurality of receiving devices, wherein said network device is operable to:

generate at least one subset of a previously transmitted set of data transfer units, wherein said subset includes a plurality of said previously transmitted set of data transfer units, wherein at most one of said data transfer units included in said subset was not correctly received by any one of said plurality of receiving devices;

generate correction data from said at least one subset of said previously transmitted set of data transfer units; and transmit said correction data to at least one of said plurality of receiving devices.

12. The network device of claim 11, wherein said network device further comprises at least one processor coupled to a program memory.

13. A computer program product having a computer program for providing correction data to a plurality of receiving devices, said computer program being stored in a computer readable medium and executable by a computer, said computer program product comprising:
- program code for generating at least one subset of a previously transmitted set of data transfer units, wherein said subset includes a plurality of said previously transmitted set of data transfer units, wherein at most one of said data transfer units included in said subset was not correctly received by any one of said plurality of receiving devices;
- program code for generating correction data from said at least one subset of said previously transmitted set of data transfer units; and
- program code for transmitting said correction data to at least one of said plurality of receiving devices.

14. A system for providing correction data to a plurality of receiving devices, comprising:
- means for generating at least one subset of a previously transmitted set of data transfer units, wherein said subset includes a plurality of said previously transmitted set of data transfer units, wherein at most one of said data transfer units included in said subset was not correctly received by any one of said plurality of receiving devices;
- means for generating correction data from said at least one subset of said previously transmitted set of data transfer units; and
- means for transmitting said correction data to at least one of said plurality of receiving devices.

15. A method for restoring data that was not correctly received, comprising:
- receiving a set of data transfer units;
- identifying a data transfer unit, associated with said set of data transfer units, that was not correctly received;
- generating a status report message identifying said data transfer unit that was not correctly received;
- receiving correction data associated with said received set of data transfer units, said correction data being further associated with a subset of said set of data transfer units, wherein said subset includes said data transfer unit that was not correctly received, and wherein at most one of said data transfer units of said subset was not correctly received by any one receiver; and
- restoring said data transfer unit that was not correctly received from those of said subset of said set of data transfer units that were correctly received in combination with said correction data.

16. The method of claim 15, wherein said restoring said data transfer unit that was not correctly received further comprises performing a logical exclusive-OR operation on said correction data and data transfer units in said subset of said set of data transfer units that were correctly received.

17. The method of claim 15, wherein said determining said data transfer unit that was not correctly received comprises determining that said data transfer unit was lost.

18. The method of claim 15, wherein said receiving said correction data further comprises receiving an identification of each of said subset of said received set of data transfer units.

19. The method of claim 18, wherein said receiving said identification of each of said subset of said received set of data transfer units comprises receiving a bit mask.

20. A network device for restoring data that was not correctly received, said network device operable to:
- receive a set of data transfer units;
- identifying a data transfer unit, associated with said set of data transfer units, that was not correctly received;
- generate a status report message identifying said data transfer that was not received;
- receive correction data associated with said received set of data transfer units, said correction data being further associated with a subset of said received set of data transfer units, wherein said subset includes said data transfer unit that was not correctly received, and wherein at most one of said subset was not correctly received by any one receiver; and
- restore said data transfer unit that was not correctly received from those of said subset of said set of data transfer units that were correctly received in combination with said correction data.

21. The network device of claim 20, wherein said network device further comprises at least one processor coupled to a program memory.

22. A computer program product having a computer program for restoring data that was not correctly received, said computer program being stored in a computer readable medium and executable by a computer, said computer program product comprising:
- program code for receiving a set of data transfer units;
- program code for identifying a data transfer unit, associated with said set of data transfer units, that was not correctly received;
- program code for generating a status report message identifying said data transfer unit that was not correctly received;
- program code for receiving correction data associated with said received set of data transfer units, said correction data being further associated with a subset of said set of data transfer units, wherein said subset includes said transfer unit that was not correctly received, and wherein at most one of said subset was not correctly received by any one receiver; and
- program code for restoring said data transfer unit that was not correctly received, said restoring being responsive to those of said subset of said set of data transfer units that were correctly received in combination with said correction data.

23. A system for restoring data that was not correctly received, comprising:
- means for receiving a set of data transfer units;
- means for identifying a data transfer unit, associated with said set of data transfer units, that was not correctly received;
- means for generating a status report message identifying said at data transfer unit that was not correctly received;
- means for receiving correction data associated with said received set of data transfer units, said correction data being further associated with a subset of said set of data transfer units, wherein said subset includes said data transfer unit that was not correctly received, and wherein at most one of said subset was not correctly received by any one receiver; and
- means for restoring said data transfer unit that was not correctly received, said restoring being responsive to those of said subset of said set of data transfer units that were correctly received in combination with said correction data.

* * * * *

UNITED STATES PATENT AND TRADEMARK OFFICE
CERTIFICATE OF CORRECTION

| | | |
|---|---|---|
| PATENT NO. | : 7,100,078 B1 | Page 1 of 1 |
| APPLICATION NO. | : 10/237392 | |
| DATED | : August 29, 2006 | |
| INVENTOR(S) | : Alexander M. Pass | |

It is certified that error appears in the above-identified patent and that said Letters Patent is hereby corrected as shown below:

Column 14, claim 20, line 5, "transfer that was not received" should read --transfer unit that was not correctly received--; and Column 14, claim 23, line 52, "said at data" should read --said data--.

Signed and Sealed this

Twenty-fourth Day of July, 2007

JON W. DUDAS
*Director of the United States Patent and Trademark Office*